United States Patent
Miron et al.

(10) Patent No.: US 11,922,013 B2
(45) Date of Patent: Mar. 5, 2024

(54) CONTENTION-REDUCED UPDATE OF STORAGE SYSTEM PARAMETERS

(71) Applicant: VAST DATA LTD., Tel Aviv (IL)

(72) Inventors: Amir Miron, Tel Aviv (IL); Avi Goren, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 212 days.

(21) Appl. No.: 17/659,321

(22) Filed: Apr. 14, 2022

(65) Prior Publication Data
US 2023/0333734 A1 Oct. 19, 2023

(51) Int. Cl.
*G06F 3/00* (2006.01)
*G06F 3/06* (2006.01)
*G06F 9/30* (2018.01)

(52) U.S. Cl.
CPC .......... *G06F 3/0604* (2013.01); *G06F 3/0611* (2013.01); *G06F 3/0653* (2013.01); *G06F 9/3004* (2013.01); *G06F 3/0679* (2013.01)

(58) Field of Classification Search
None
See application file for complete search history.

(56) References Cited

U.S. PATENT DOCUMENTS

2023/0145992 A1* 5/2023 Zdornov ............... G06F 3/0604
711/154

* cited by examiner

*Primary Examiner* — Midys Rojas
(74) *Attorney, Agent, or Firm* — Reches Patents

(57) ABSTRACT

A method for contention reduced update of one or more storage system parameters, the method may include (i) concurrently monitoring the one or more storage system parameters (SSPs) by compute entities (CEs); wherein the concurrently monitoring comprises updating, by the CEs, local counters allocated to different SSPs; (ii) updating, by the CEs, sets of shared counter fields with values of the local counters, wherein different sets are allocated to different SSPs; wherein an updating of a set of a shared counter fields by an CE comprises selecting a shared counter field of the set by the CE; and (iii) calculating values of the different SSPs, wherein a calculating of a value of a SSP is based on at least one value of at least one shared counter field of a set that is allocated to the SSP.

18 Claims, 4 Drawing Sheets

---

Concurrently monitoring the one or more storage system parameters (SSPs) by compute entities (CEs). Step 210 may include updating, by the CEs, local counters allocated to different SSPs parameters. The updating of a certain counter may include aggregating information. 210

↓

Updating, by the CEs, sets of shared counters fields with values of the local counters, wherein different sets are allocated to different SSPs. An updating of a set of a shared counter fields by an CE may include selecting a shared counter field of the set by the CE 220

↓

Calculating values of the different SSPs, wherein a calculating of a value of a SSP is based on at least one value of at least one shared counter field of a set that is allocated to the SSP 230

↓

Responding to the values of the different SSPs 240

Configuration step 250

200

CONTENTION-REDUCED UPDATE OF STORAGE SYSTEM PARAMETERS

TECHNICAL FIELD

The present disclosure generally relates to the field of data storage, and more particularly to a management of contention-reduced update of storage system parameters.

BACKGROUND

Lock contention is a situation that occurs when a compute entity attempts to acquire a lock held by another compute entity. The lock contention causes the compute entity that attempts to acquire the lock, to encounter suspension until the lock is released.

A high rate of lock contentions leads to wasted processing resources due to spinlock processing, elevated context switching overhead when compute entities begin to wait for the lock, and low latency caused by the suspension. Therefore, the overall performance of the system is affected.

Other mutual exclusion techniques (besides locks) used for controlling concurrent updates may also lead to longer latencies and wasted processing resources.

A high number of compute entities that intensively update the same content, which is protected by locks, may increase the potential of heavy contention.

SUMMARY

There may be provided a storage system, a method and a non-transitory computer readable medium for contention-reduced update of storage system parameters.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
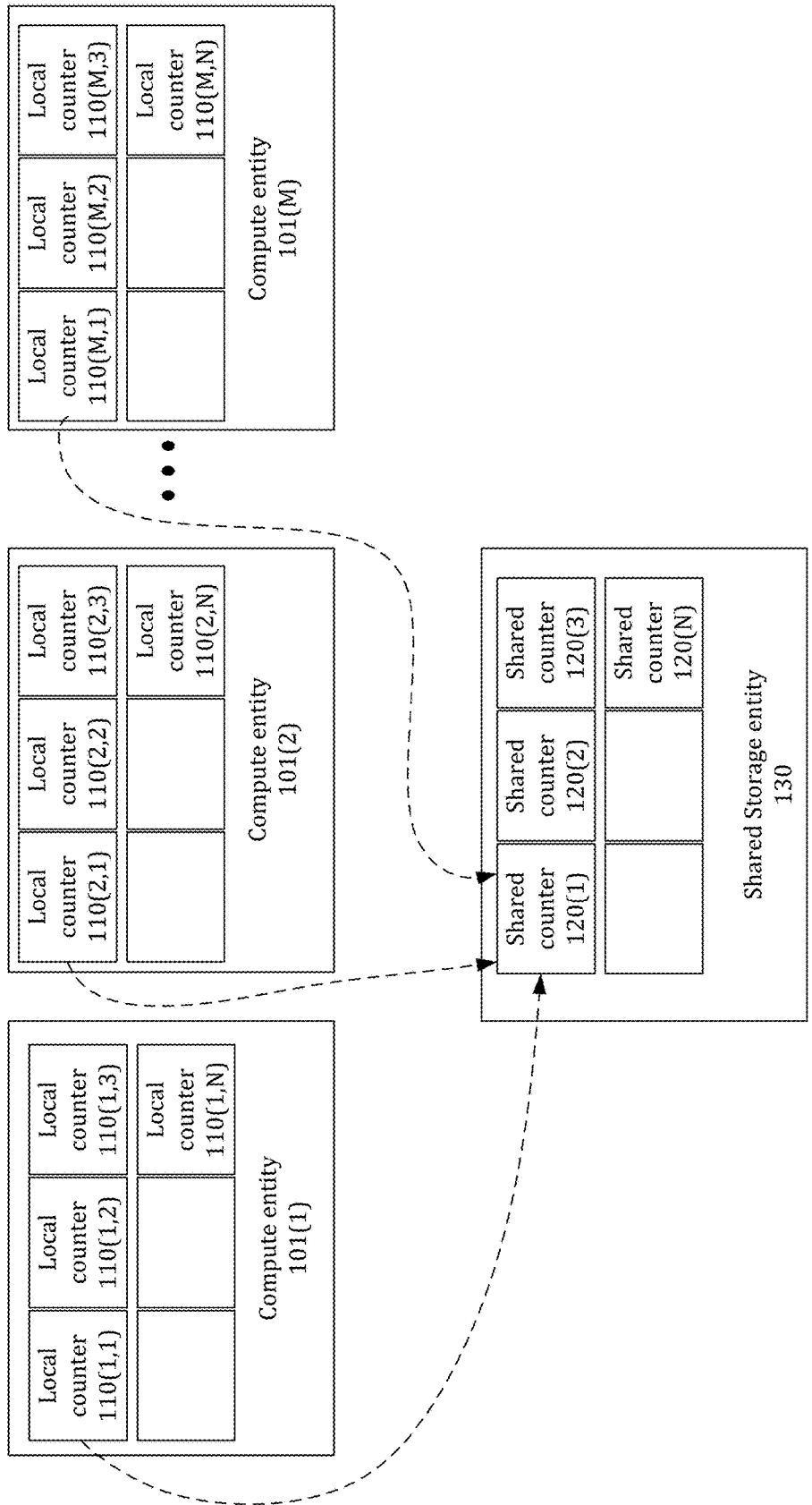
FIG. 1 is an example of data structures.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a non-transitory computer readable medium and a method for contention-reduced update of one or more storage system parameters.

Multiple compute entities of a storage system need to accumulate various statistics for monitored usage of storage resources or other parameters of the storage system. The statistics may be updated at a very high rate, particularly, when the statistics need to be updated per each of intensive storage operations, such as statistics gathered for incoming write requests.

As an example, usage quota may be assigned per each user of a storage system per various usages of various storage resources. For example, each user may be assigned with quota per each of pre-defined directories. Multitude counters may be involved in accumulating usage statistics required for detecting quota violation. Quota violation may require immediate restraining of the violated usage of the storage resource (e.g., further writes to a directory whose quota has been exhausted are halted upon directory quota violation).

Any of the compute entities may receive access requests from any user, directed to any monitored storage resource (e.g., directory), as there may not be a pre-defined assignment of responsibilities for received access requests. Therefore, each compute entity may be required to update any of the statistics counters, and the same counter may be accessed and updated by multiple compute entities.

The number of compute entities can reach hundreds, thousands, tens of thousands, and more. The total number of counters used for collecting statistics of a storage parameter can be very large. For example, the number of users can reach, e.g., one million users, and the number of monitored directories per user can reach thousands of directories, therefore, the total number of counters for monitoring usage can reach several billions that can be subject to modification by each compute entity.

Accessing such a large number of counters by a large number of compute entities that update the counters, at a high rate, can dramatically increase the time consumed on lock contention (or on any other mutual exclusion being used), that occurs when more than one compute entity tries to lock a specific counter for update.

According to embodiments of the invention, each compute entity updates local counters in its private cache memory during recurrent monitoring periods, wherein different local counters of a same compute entity are associated with different storage system parameters (SSP)—and with different shared counters that are also allocated to the different SSPs. The same SSP may be associated with multiple local counters at multiple compute entities, since multiple compute entities can monitor events related to the same SSP. The multiple local counters of the same SSP may have different values, during the monitoring periods, since each compute entity may encounter different events related to monitoring of the same SSP, e.g., write requests received by different compute entities that consume the same storage resource. The aggregated value of all the local counters of the same SSP reflects the current value of the SSP. The aggregation is performed into a shared counter of the SSP. The term local counter refers to the contribution of a specific compute entity, during a specific monitoring period, to a shared counter related to a certain SSP. The local counters are temporarily stored in a private memory of the compute entity and are not shared with other compute entities during the monitoring. Periodically, or at the end of each monitoring period, the local counters that were updated (for example—aggregated with values related to monitoring the SSP during the monitoring period) by the compute entities need to be summed into the shared counters. The local counters may include a delta measure of what has changed during a certain monitoring period, as monitored and measured by each compute entity. For example, the change in the size of a certain directory by a certain user, where the change can be a positive number, if the size has been increased, or a negative number, if the size has been decreased.

The monitoring period, when each compute entity updates changes of local counters in its private memory, prevents the contention that would occur constantly, if all the compute nodes would have accessed shared counters, constantly.

When the monitoring period is ended, each compute entity adds its updated local counters to shared counters that are stored in a storage location that is accessible to all the compute entities. Given the vast numbers of updating (compute) entities and the vast number of shared counters accessed by the updating entities, there is a need to decrease the probability of contentions that may occur at this stage.

According to an embodiment of the invention, each shared counter is stored in the shared access storage as a set of shared counter fields, where each shared counter field is a portion of the whole value of the shared counter, and can be accessed and updated independently from the other shared counter fields of the set. The number of shared counter fields in a set may be smaller than the number of compute entities, to restrict the amount of storage needed for storing billions of counters implemented as sets of shared counter fields. For example, the number of shared counter fields of one shared counter may reach 10 or 20 shared counter fields, while the number of compute nodes can be more than one order of magnitude above the number of shared counter fields.

When the monitoring period is ended, each compute entity updates each affected shared counter with its corresponding local counter that has been changed during the monitoring period by: randomly selecting a shared counter field of a set related to the updated shared counter, locking only the shared counter field (and not the entire shared SSP counter, i.e., other shared counter fields of the same shared counter are not affected by the locking), updating the shared counter field with the content of the local counter, and releasing the lock of the shared counter field. Other mutual exclusion technique can be applied on the shared counter field instead of locking. This way, multiple compute entities can simultaneously update the same shared counter, where each compute entity locks and updates a different shared counter field, and therefore a contention is eliminated, or at least reduced.

Randomly selecting a shared counter fields at each update to a shared counter prevents contention in cases where two or more compute entities receive access requests directed to the same storage resources, during the same monitoring period, and need to update the same shared counters related to the same storage resources.

After updating a shared counter field of a shared counter, the corresponding local counter can be zeroed before continuing aggregating during another monitoring period.

Every time interval (summing time interval) a summing of the shared counter fields is performed, by either a single compute entity, or each compute entity may take a responsibility for summing pre-defined counters.

The time between summing intervals may be longer than the duration of the monitoring period. For example, the monitoring period may be one second long, and the duration between summing time intervals may be 20 seconds, one minute, 10 minutes, etc. The relatively short monitoring period facilitates avoiding significant counting errors when a compute node fails, and its local counter s are lost. Since only e.g., one second of monitoring of one compute entity is lost, the error in the sum of the corresponding shared counters is not significant. Having a relatively longer summing intervals limits potential contention which may occur during summing. On the other hand, the summing intervals are not too long, so that the shared counters are kept updated.

The summing includes summing the shared counter fields of each set of shared counter fields and the result is added to the corresponding shared counter that reflects the current state of the system parameter being monitored.

The current values of the sums of the shared counters serve for monitoring the desired storage system parameter, e.g., resource consumption and quota violation of specific user and specific resource, etc.

FIG. 1 illustrates multiple (M) compute entities 101(1)-101(M), each includes N local counters (related to multiple—for example N—different SSPs) that are parts of N shared SSP counters. Compute entity 101(1) includes local counters 110(1,1)-110(1,N), compute entity 101(2) includes local counters 110(2,1)-110(2,N), and compute entity 101(M) includes local counters 110(M,1)-110(M,N). Local counters 110(1,1), 110(2,1) to local counter 110(M,1) are all associated with the same system parameter whose statistics are accumulated by shared SSP counter 120(1), as illustrated by the dashed arrows.

A shared storage entity 130 is accessible to all the compute entities, and stores all the shared counters 120(1)-120(N).

Figure 2:
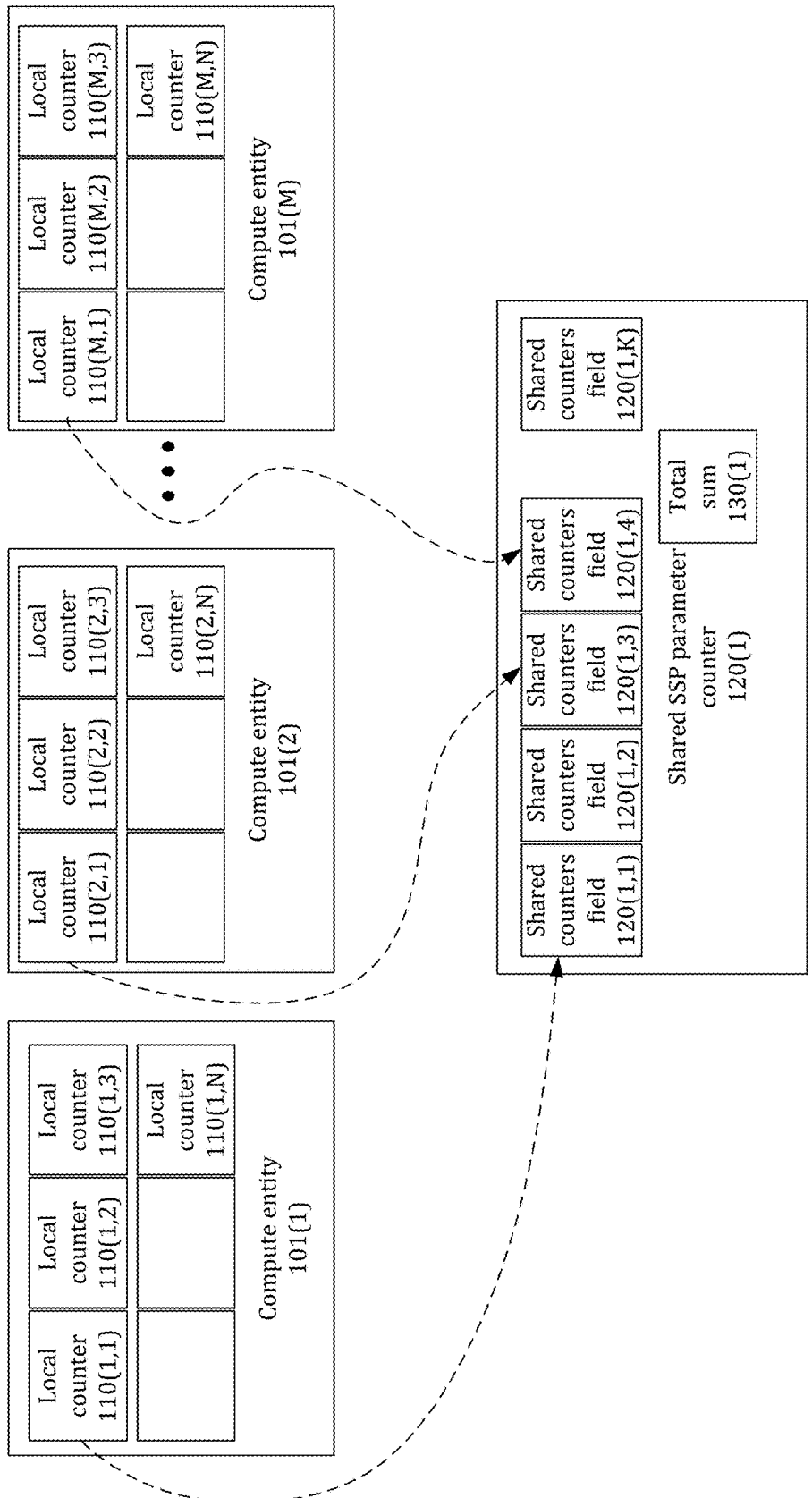
FIG. 2 is an example of data structures.

FIG. 2 illustrates the structure of shared SSP counter 120(1) that includes a set of K shared counter fields 120(1,1)-120(1,K). FIG. 2 further illustrates an access of three compute entities at a certain point in time, at an end of a certain monitoring period when the shared counters are being updated. In this example, each compute entity has randomly selected a different shared counter field of the shared SSP counter 120(1) for adding the content of the corresponding counter. Compute entity 101(1) is accessing shared counter field 120(1,1) for adding the content of local counter 110(1,1), compute node 101(2) is accessing shared counter field 120(1,3) for adding the content of local counter 110(2,1), and compute node 101(M) is accessing shared counter field 120(1,4) for adding the content of local counter 110(M,1).

It is noted that for further reducing the chances of contention, the monitoring period can end at different times for each compute node. But even if all the three compute nodes of the above example are accessing the same shared SSP counter 120(1) concurrently, still the contention is eliminated due to the split access to different shared counter fields.

Every several monitoring periods, or every summing interval, a counter manager, which may be a module in one, some or all of the compute entities, sums the shared counter fields of each shared counter, add the sum to the shared counter, and zeros the content of the shared counter fields. Total sum 130(1) represents the current value of shared counter 120(1).

Shared SSP counters 120(2)-120(N) has a structure that is similar to the structure of shared SSP counter 120(1).

Figure 3:
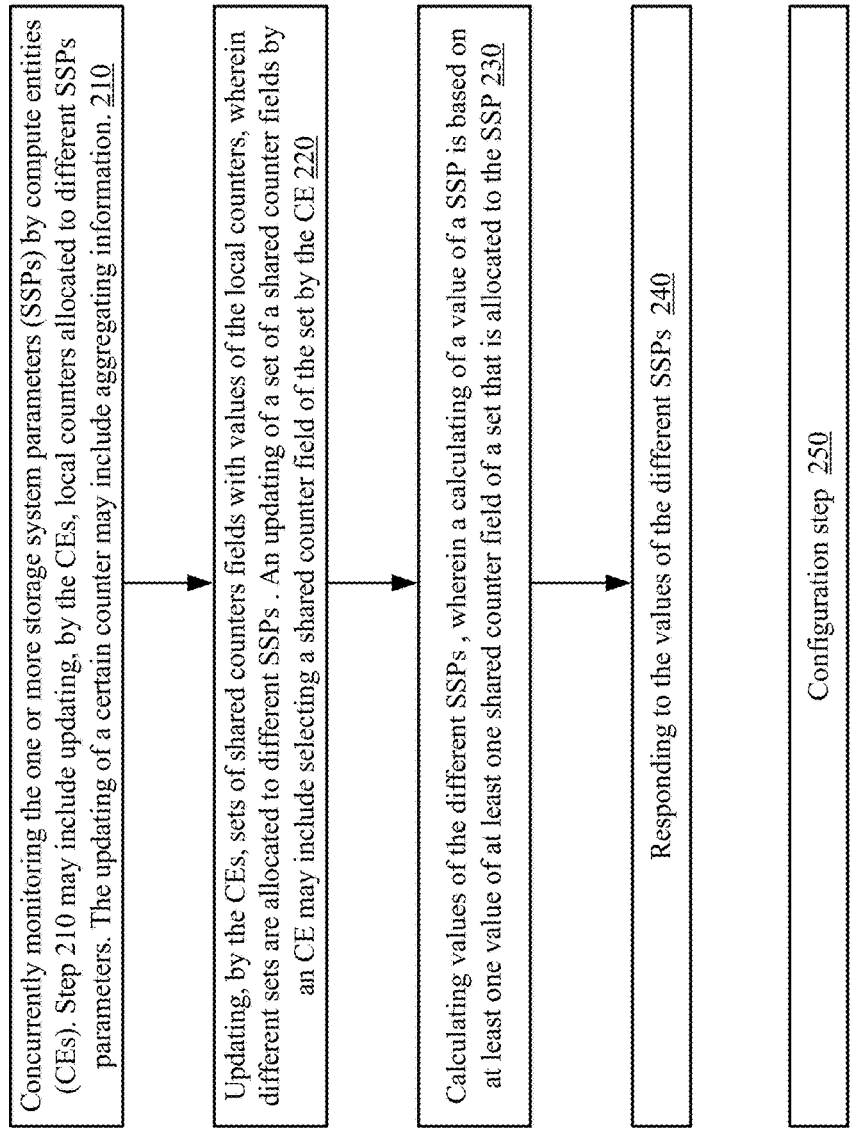
FIG. 3 is an example of a method.

FIG. 3 illustrates an example of method 200 for contention-reduced update of one or more storage system parameters.

Method 200 may start by step 210 of concurrently monitoring the one or more storage system parameters (SSPs) by compute entities (CEs) of the storage system. Step 210 may include updating, by the CEs, local counters allocated to different SSPs. The updating of a certain local counter may include aggregating information (for example, adding to or subtracting from the local counter, or other aggregation operation for aggregating values of new events related to the monitoring of the SSP). The monitoring and the updating of local counters may be performed during recurrent monitoring periods, wherein during a monitoring period the update of the local counters are performed in multiple iterations, i.e., the same local counter may be updated multiple times by a compute entity, and/or the compute entity may update multitude local counters during one monitoring period. Monitoring periods of different compute entities may or may not overlap.

The SSPs may include storage utilization parameter. The storage utilization parameter may be of a specific storage resource.

The SSPs may include storage utilization by groups of at least one user. For example, a storage utilization of a specific resource by a specific user or a specific group of users.

Step 210 may be followed by step 220 of updating, by the CEs, sets of shared counter fields with values of the local counters, wherein different sets are allocated to different SSPs. An updating of a set of a shared counter field by an CE may include selecting a shared counter field of the set by the CE and updating the selected shared counter field. Step 220 may be executed iteratively, for example, every certain time internal or when a monitoring period is ended.

Step 220 may include randomly selecting a shared counter field by one or more CEs. The random selection is performed upon each update iteration, so that upon each iteration, a different shared counter field of the set may be selected.

Step 220 may include concurrently updating the sets. A concurrent update of a specific set may include concurrently updating different shared counter fields of the set by different compute entities. For example, a first compute entity may select and update a first shared counter field, and a second compute entity may select and update another shared counter field of the same set.

The shared counter fields may be independently accessible by all the CEs.

Step 220 may include updating of a shared counter field is executed by an atomic read modify write operation.

Step 220 may include updating of a shared counter field by applying a mutual exclusion on the shared counter field. The mutual exclusion applied by a specific compute entity on a specific shared counter field does not affect other shared counter fields of the set that may be applied with independent mutual exclusion by other compute entities.

Multiple iterations of step 210 may be executed per one iteration of step 220. For example, a specific local counter can be updated multiple times during a monitoring period, and only then the corresponding shared counter is updated as described for step 220.

Two or more sets of the different sets may have the same number of shared counter fields.

Two or more sets of the different sets may differ from each other by a number of shared counter fields.

Step 220 may be followed by step 230 of calculating values of the different SSPs, wherein a calculating of a value of a SSP is based on at least one value of at least one shared counter field of a set that is allocated to the SSP. The calculating may include summing of the shared counter fields, or any kind of other aggregating applied on one or more shared counter fields that has been updated in step 220.

Step 230 may be followed by step 240 of responding to the values of the different SSPs. The responding may include storing at least some of the different SSPs, communicating the different SSPs to another computerized entity (within and/or outside the storage system, for example a management system), limiting a usage of one or more user to storage resources of the storage system, and the like.

The local counters allocated to different SSPs may be stored in private memories of the CEs—such as caches of the CEs.

Method 200 may include configuration step 240 of determining a number of shared counter fields of a set based on a popularity of a SSP associated with the set. For example, a popular SSP may be a certain storage resource that is expected to be updated more frequently, such as a large sized directory or a directory that is being written to frequently.

Step 240 may include determining a number of shared counter fields of a set based on a usage quota allocated to a user associated with a SSP that is associated with the set and/or based on a user priority and/or a distribution of occurrence of any SSP, a priority assigned to the SSP, a criticality of the SSP, a dependency between one SSP to another, a status (for example availability) of storage resources and/or compute entities of the storage system, and the like.

Figure 4:
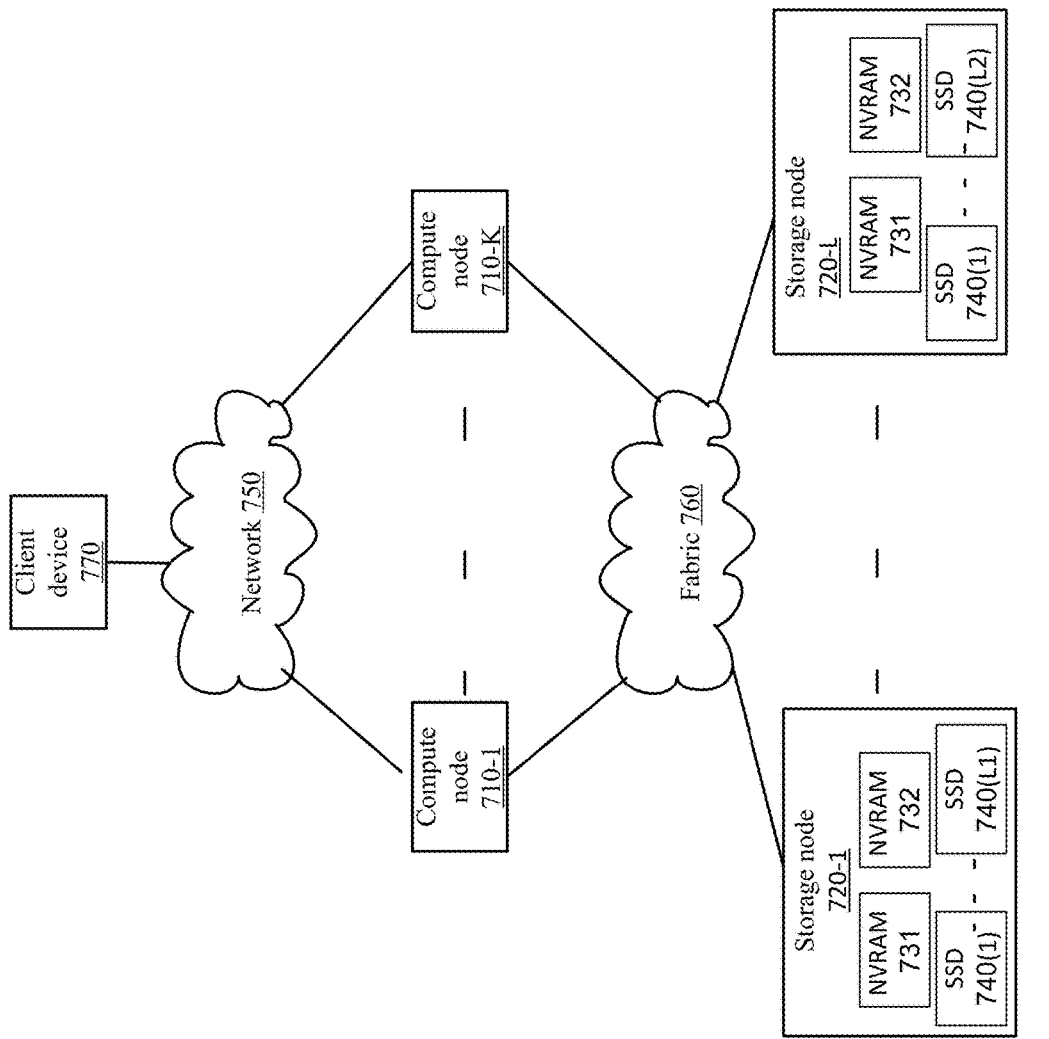
FIG. 4 is an example of a storage system.

FIG. 4 illustrates a storage system 700 that includes storage system compute elements such as multiple (N) compute nodes 710-1 to 710-N and multiple (M) storage nodes 720-1 to 720-M. The storage nodes may store the one or more file systems and are accessible to any compute node. The compute entities may be the compute nodes or compute cores within the compute nodes. Each compute node may include multiple compute cores (which may be the compute entities). The compute entities may be configured to execute method 200. The compute nodes may include internal memory, e.g., RAM, NVRAM (Non-Volatile Random Access Memory) that is served for storing the local counters of the one or more compute entities hosted in the compute node.

The compute nodes communicate with the storage nodes via a network, such as fabric 760, and with one or more clients, such as client device 770, via network 750, may receive various requests from client device 770, associate the requests (e.g., write requests) with a monitored SSP (e.g., a size of a directory) and update the corresponding counters. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The SSP shared counters may be stored in various storage devices of the storage nodes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for contention-reduced update of one or more storage system parameters, the method comprises:

concurrently monitoring the one or more storage system parameters (SSPs) by compute entities (CEs); wherein the concurrently monitoring comprises updating, by the CEs, local counters allocated to different SSPs;

updating, by the CEs, sets of shared counter fields with values of the local counters, wherein different sets are allocated to different SSPs; wherein an updating of a set of a shared counter fields by a CE comprises selecting a shared counter field of the set by the CE; and calculating values of the different SSPs, wherein a calculating of a value of a SSP is based on at least one value of at least one shared counter field of a set that is allocated to the SSP.

2. The method according to claim 1 wherein the updating of a set comprises randomly selecting the shared counter field by one or more CEs.

3. The method according to claim 1 wherein the updating comprises concurrently updating the sets.

4. The method according to claim 1 wherein the SSPs comprises storage utilization parameter.

5. The method according to claim 4 wherein the SSPs comprises storage utilization by groups of at least one user.

6. The method according to claim 1 wherein the shared counter fields are independently accessible by all the CEs.

7. The method according to claim 6 wherein an updating of a shared counter field is executed by an atomic read modify write operation.

8. The method according to claim 6 wherein an updating of a shared counter field is executed by applying a mutual exclusion on the shared counter field.

9. The method according to claim 1 comprising responding to the values of the different SSPs.

10. The method according to claim 9 wherein the responding comprises limiting a usage of one or more user to storage resources of the storage system.

11. The method according to claim 1 wherein the local counters allocated to different SSPs are stored in caches of the CEs.

12. The method according to claim 1 comprises performing multiple iterations of the concurrently monitoring and per one iteration of the updating of the sets of shared counter fields.

13. The method according to claim 1 wherein a first set has a same number of shared counter fields as a second set.

14. The method according to claim 1 wherein a first set has fewer shared counter fields than a second set.

15. The method according to claim 1 comprising determining a number of shared counter fields of a set based on a popularity of a SSP associated with the set.

16. The method according to claim 1 comprising determining a number of shared counter fields of a set based on a usage quota allocated to a user associated with a SSP associated with the set.

17. A non-transitory computer readable medium for contention reduced update of one or more storage system parameters, the non-transitory computer readable medium stores instructions for:

concurrently monitoring the one or more storage system parameters (SSPs) by compute entities (CEs); wherein the concurrently monitoring comprises updating, by the CEs, local counters allocated to different SSPs;

updating, by the CEs, sets of shared counter fields with values of the local counters, wherein different sets are allocated to different SSPs; wherein an updating of a set of a shared counter fields by a CE comprises selecting a shared counter field of the set by the CE; and calculating values of the different SSPs, wherein a calculating of a value of a SSP is based on at least one value of at least one shared counter field of a set that is allocated to the SSP.

18. A storage system that comprises storage resources and compute entities (CEs); wherein the CEs are configured to:

concurrently monitor one or more storage system parameters (SSPs); wherein a concurrently monitoring comprises updating, by the CEs, local counters allocated to different SSPs;

update sets of shared counter fields with values of the local counters, wherein different sets are allocated to different SSPs; wherein an updating of a set of a shared counter fields by a CE comprises selecting a shared counter field of the set by the CE; and calculate values of the different SSPs, wherein a calculating of a value of a SSP is based on at least one value of at least one shared counter field of a set that is allocated to the SSP.

* * * * *